(12) United States Patent
Kimura et al.

(10) Patent No.: US 7,710,685 B2
(45) Date of Patent: May 4, 2010

(54) MAGNETIC HEAD MAIN POLE WITH LEADING AND TRAILING EDGES OF DIFFERENT LENGTHS AND PROGESSIVELY INCREASING CROSS-SECTIONAL AREA IN A HEIGHT-DIRECTION

(75) Inventors: Hisashi Kimura, Kanagawa (JP); Atsushi Kato, Kangawa (JP); Norihiro Ookawa, Kangawa (JP); Kikuo Kusukawa, Saitama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 616 days.

(21) Appl. No.: 11/650,336

(22) Filed: Jan. 5, 2007

(65) Prior Publication Data

US 2007/0195454 A1    Aug. 23, 2007

(30) Foreign Application Priority Data

Jan. 6, 2006    (JP) .............................. 2006-001296

(51) Int. Cl.
*G11B 5/127* (2006.01)
(52) U.S. Cl. ............... 360/125.09; 360/125.1; 360/125.13; 360/125.14; 360/125.59; 360/125.6
(58) Field of Classification Search .............. 360/125.1, 360/125.09, 125.13, 125.14, 125.19, 125.2, 360/125.46, 125.47, 125.51, 125.52, 125.59, 360/125.6, 125.64, 125.65
See application file for complete search history.

(56) References Cited

U.S. PATENT DOCUMENTS

| 6,631,054 | B2 | 10/2003 | Miyazaki et al. | |
|---|---|---|---|---|
| 6,813,116 | B2 | 11/2004 | Makamura et al. | |
| 6,952,325 | B2 * | 10/2005 | Sato et al. ............... | 360/125.08 |
| 7,038,881 | B2 * | 5/2006 | Ito et al. ................. | 360/125.14 |
| 2003/0112555 | A1 | 6/2003 | Sato et al. | |
| 2004/0047079 | A1 | 3/2004 | Ito et al. | |
| 2004/0061988 | A1 | 4/2004 | Matono et al. | |

FOREIGN PATENT DOCUMENTS

| JP | 2002-100005 A | 4/2002 |
|---|---|---|
| JP | 2003-203311 A | 7/2003 |
| JP | 2005-216361 | 8/2005 |

* cited by examiner

*Primary Examiner*—A. J. Heinz
(74) *Attorney, Agent, or Firm*—Townsend and Townsend and Crew LLP; Rambod Nader

(57) ABSTRACT

If the length of a track-defining section from an air bearing surface varies due to tolerance during a head manufacturing process, the recording magnetic field changes, which involves the variation of the track width to be recorded on the medium. In accordance with an embodiment of the present invention, the main magnetic pole of a magnetic head includes a track-defining section shaped in trapezoid and a magnetic flux guiding section formed in trapezoid, as viewed from above. The track-defining section is formed such that its width parallel to the air bearing surface (ABS) increases at the rate of 10 to 20% with respect to its height-direction length. The rate of 10 to 20% is a range in which the shape is properly controllable taking into account the variations resulting from the tolerance of the head manufacturing process.

7 Claims, 8 Drawing Sheets

MAGNETIC HEAD MAIN POLE WITH LEADING AND TRAILING EDGES OF DIFFERENT LENGTHS AND PROGESSIVELY INCREASING CROSS-SECTIONAL AREA IN A HEIGHT-DIRECTION

CROSS-REFERENCES TO RELATED APPLICATIONS

The instant nonprovisional patent application claims priority to Japanese Patent Application 2006-001296, filed Jan. 6, 2006 and incorporated by reference herein for all purposes.

BACKGROUND OF THE INVENTION

The present invention relates to a magnetic head having a single magnetic pole head for perpendicular magnetic recording and a method of manufacturing the magnetic head.

Hard disk drives, or magnetic recording and reproducing devices, are primarily used as external storage devices for information processing devices such as computers. As technology evolves, these drives have become larger in capacity and smaller in size. Hard disk drives were primarily developed to improve recording density. If the recording density is increased by using conventional longitudinal magnetic recording, however, the demagnetizing field may become too large in the magnetization transition region of the recording medium. Therefore, there becomes a need to reduce the thickness of the recording layer, which may cause destruction of recorded data due to thermal fluctuations. In perpendicular magnetic recording in which recording magnetization is made in the thickness direction of the medium, on the other hand, a high recording density is easily achieved since demagnetization is small in the magnetization transition region, which alleviates the necessity of reducing the thickness of the medium.

When signals are recorded on a perpendicular recording medium with a magnetic head for perpendicular magnetic recording, namely, a perpendicular magnetic recording head (single magnetic pole head), the electric signals are converted into magnetic signals by a coil. This induces a magnetic flux in a main magnetic pole and a auxiliary magnetic pole. The magnetic flux partially passes from the auxiliary magnetic pole to the main magnetic pole and penetrates the perpendicular recording layer of the medium. The magnetic flux further passes through the soft magnetic underlayer below the perpendicular recording layer and returns to the auxiliary magnetic pole, thus forming a closed loop. The auxiliary magnetic pole serves to return the magnetic flux, which is directed from the main magnetic pole to the perpendicular recording layer and soft magnetic underlayer of the recording medium, and then back to the main magnetic pole in a magnetically effective manner. Using such a magnetic flux flow allows the signals to be recorded as a magnetization on the perpendicular recording layer.

In order to increase recording densities, the recording track width may be reduced. In addition, reading and writing need to be performed on the wide area from the inner circumference to the outer circumference of the recording medium in the hard disk drives. The reading and writing are performed on the inner and outer circumferences of the medium with the skew angle of the magnetic head ranging from about −15° to 15° relative to the tangential line parallel to the rotational direction of the medium. In this case, if the main magnetic pole is rectangular on the air bearing surface, then the recording track widths cannot be reduced. As such, the width of the magnetic pole piece on the leading side becomes smaller than that on the trailing side, thereby achieving narrower track widths.

The main magnetic pole of a recording head may be formed to have a columnar track defining section and a magnetic flux guiding section. The track defining section extends from an air bearing surface in a direction substantially perpendicular to the medium. The magnetic flux guiding section is joined to the track defining section and increased in a cross-sectional area as it is spaced apart from the air bearing surface.

Ion milling is generally used to from the main magnetic pole. Patent document 1 (Japanese Laid-Open Patent No. 2005-216361) describes formation of a main magnetic pole by ion milling. As described in patent document 1, the width of the magnetic pole piece located on the bottom surface of the track-defining section and on the side of a substrate, is progressively narrowed as it becomes close to the air bearing surface. In conjunction with this, the magnetic pole piece width of the upper surface of the track-defining section is progressively narrowed as it becomes close to the air bearing surface. This is due to the shade during ion milling since a mask is formed on the magnetic flux guiding section. With such a structure, if the length of the track defining section from the air bearing surface is varied due to tolerance in the head manufacturing process, this has an adverse effect on the distribution of the magnetic pole piece width of the track-defining surface on the air bearing surface.

In addition, patent document 1 describes a method for improving the structure in which the magnetic pole piece width of the upper surface of the track defining section is narrowed as it becomes close to the air bearing surface. In this method, a nonmagnetic layer or an organic resin layer with a low etching rate is formed on a magnetic layer that serves as the main magnetic pole. Then, etching is performed by ion milling using the nonmagnetic layer or the organic resin layer as a mask while switching the following three processes:

(1) An etching process is performed by setting the incident angle of the ion beam to 50°±20°, and emitting the ion beam while horizontally vibrating the substrate surface in the range of ±(30° to 150°) or from all directions of 360° relative to the direction of the ion beam based on the direction from the medium to the air bearing surface.

(2) Next, an etching process is performed by setting the incident angle of the ion beam to 60°±20°, and emitting ion beams mainly in a range between +90° to +135° based on the direction from the medium to the air bearing surface while horizontally vibrating the substrate surface at a predetermined angle in a range of ±45°.

(3) Lately, an etching process is performed by setting the incident angle of the ion beam to 60°±20°, and emitting ion beams mainly in a range between −90° to −135° based on the direction from the medium to the air bearing surface while horizontally vibrating the substrate surface at a predetermined angle in a range of ±45°.

It is important for the perpendicular magnetic head to cause the recording medium to generate a large recording magnetic field. As described above, reducing the recording track width causes the lowering of a recording magnetic field that is generated from the recording head to the medium side. Accordingly, this needs to reduce the length of the track-defining section from the air bearing surface (the length to a flare point) as well as to reduce the recording track widths. If the length of the track-defining section from the air bearing surface to the flare point is reduced, the upper surface of the main magnetic pole on the air bearing surface that is formed to have a uniform width as with the conventional technique described above largely changes the recording magnetic field in the case where the length of the track-defining section from the air bearing surface varies. This is due to tolerance during the head manufacturing process caused by the varying lengths of the track-defining section from the air bearing surface. Since the width of the recording magnetic field varies at the same time, the track widths to be recorded on the medium are varied consequently.

BRIEF SUMMARY OF THE INVENTION

If the length of a track-defining section from an air bearing surface varies due to tolerance during a head manufacturing process, then the recording magnetic field changes, causing variation of the track width to be recorded on the medium. In accordance with an embodiment of the present invention, the main magnetic pole of a magnetic head includes a track-defining section shaped in trapezoid and a magnetic flux guiding section formed in trapezoid. The track-defining section is formed such that its width parallel to the air bearing surface (ABS) increases at the rate of 10 to 20% with respect to its height-direction length. The rate of 10 to 20% is a range in which the shape is properly controllable taking into account the variations resulting from the tolerance of the head manufacturing process.

For a more complete understanding of the present invention, reference is made to the following detailed description taken in conjunction with the accompanying drawings wherein:

DETAILED DESCRIPTION OF THE INVENTION

An object of embodiments in accordance with the present invention is to provide a magnetic head for perpendicular magnetic recording in which a magnetic width to be recorded on a medium is reduced in variation, even if the length of the track-defining section from the air bearing surface is varied, and a method of manufacturing the magnetic head.

A typical magnetic head in accordance with the present invention includes: a main magnetic pole provided with an air bearing surface; a auxiliary magnetic pole magnetically coupled to the main magnetic pole on the side opposite to the air bearing surface; a coil provided to magnetically excite the auxiliary magnetic pole and the main magnetic pole; and an insulating film disposed between the auxiliary magnetic pole and the main magnetic pole. The main magnetic pole includes: a track defining section with an upper side width larger than a lower side width; and a magnetic flux guiding section joined to the track defining section and progressively increased in cross-sectional area as spaced apart from the air bearing surface. The upper side width of the track defining section increases as the height-direction length increases at a rate of 10 to 20% with respect to the length of the track defining section.

According to one embodiment of the present invention, a magnetic head for perpendicular magnetic recording is provided in which a magnetic width to be recorded on a medium is reduced in variation even if the length of the track defining section from the air bearing surface is varied.

Certain embodiments of the present invention will hereinafter be described in detail with reference to the drawings.

Figure 1:
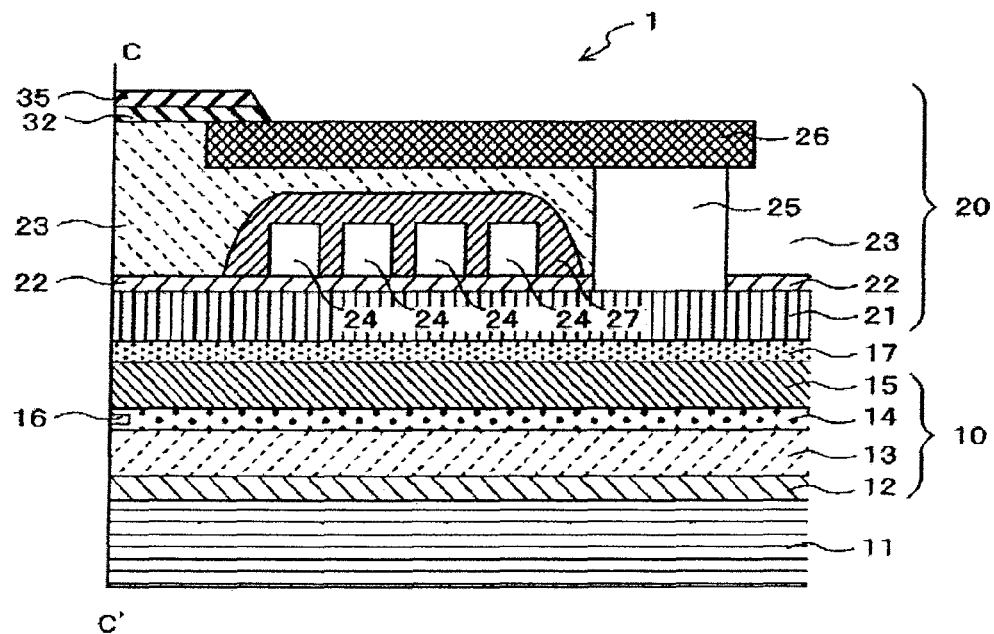
FIG. 1 is a cross-sectional view of a magnetic head according to an embodiment of the present invention.
Figure 2:
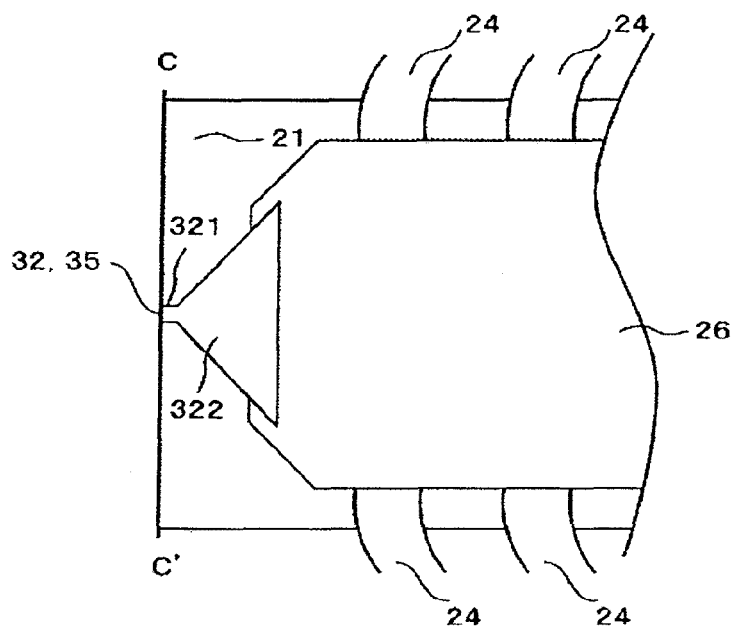
FIG. 2 is a plan view of the magnetic head illustrated in FIG. 1.
Figure 3:
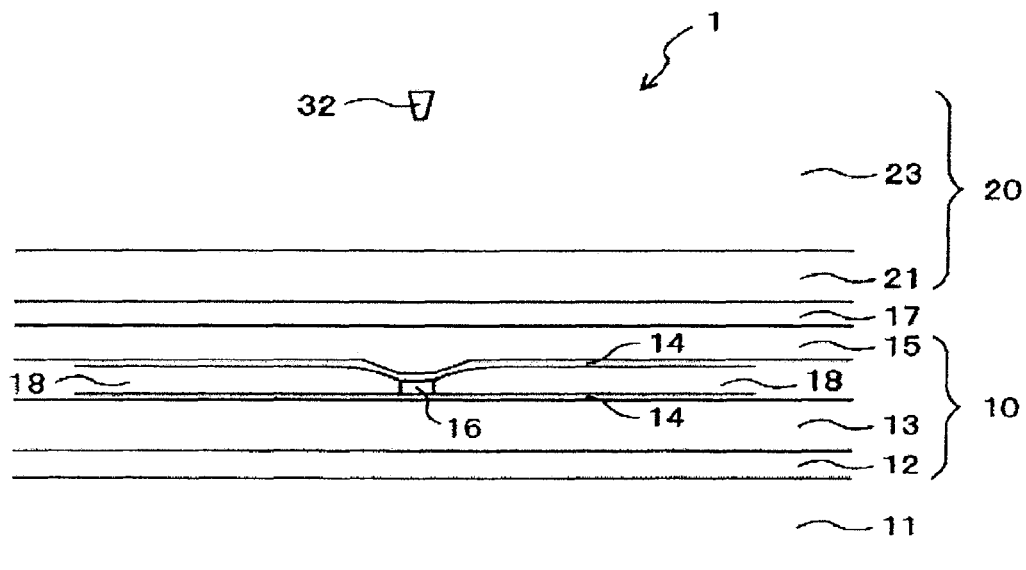
FIG. 3 illustrates an air bearing surface of the magnetic head illustrated in FIG. 1.
Figure 4:
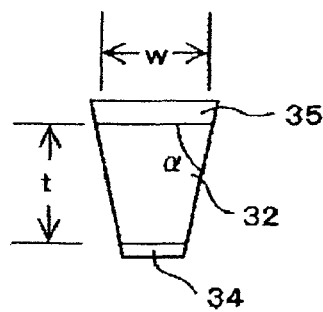
FIG. 4 is an enlarged view of a main magnetic pole part illustrated in FIG. 3.

FIGS. 1 to 4 illustrate different views of the configuration of a perpendicular recording magnetic head (magnetic head) by way of example. FIG. 1 is a cross-sectional view of the magnetic head, illustrating a cross-section perpendicular to both surfaces, i.e., an air bearing surface and a substrate surface. FIG. 2 is a plan view of the magnetic head, partially illustrating a plane perpendicular to the air bearing surface and parallel to the substrate surface. FIG. 3 illustrates the air bearing surface of the magnetic head. FIG. 4 is an enlarged view of a main magnetic pole section in the air bearing surface. In these figures, reference numeral 1 denotes the magnetic head; 11, a substrate; 12, an insulating film; 13, a lower shield; 14, an insulating film; 15, an upper shield; 16, a magnetoresistive effect element; 17, an insulating film; and 18, an electrode. Reference numeral 21 denotes a auxiliary magnetic pole; 22, an insulating film; 23, an insulating film; 24, coils; 25 and 26, yokes; 27, an interlayer insulating film; 32, a main magnetic pole; 34, an underlayer film; and 35, a nonmagnetic metal film. Note that a line C-C' denotes the air bearing surface (air bearing surface) of the magnetic head.

A read section (read head) of the magnetic head 1 is configured to include the lower shield 13, the magnetoresistive effect film 16, and the upper shield 15. The electrode 18 and a magnetic domain control film (not shown) are connected to both sides of the magnetoresistive effect film 16. The magnetoresistive effect film 16 may use a film having the magnetoresistive effect such as an AMR (anisotropic magnetoresistive) film, or a GMR (giant magnetoresistive) film. Alternatively, the magnetoresistive film 16 may use a TMR (tunnel magnetoresistive) film or a CPP type magnetoresistive film in which an electric current is allowed to flow perpendicularly to the film. A write section (write head) 20 of the magnetic head 1 is configured such that the coils 27, which are covered with the interlayer insulating film 27, are disposed on the auxiliary magnetic pole 21 via the insulting film 22 and the auxiliary magnetic pole 21 is magnetically connected to the main magnetic pole 32 via the yokes 25, 26.

As shown in the plan view of FIG. 2, the main magnetic pole 32 of the write head 20 is configured to include a thin track defining part 321 and a magnetic flux guiding part 322. The track defining part 321 has a region extending from the air bearing surface to a position which is 20 to 300 nm apart therefrom. The magnetic flux guiding part 322 is shaped to progressively broaden from this position.

As shown in FIG. 3, in the air bearing surface of the magnetic head 1 according to an embodiment of the present invention, the main magnetic pole 32 is formed above the auxiliary magnetic pole 21 via the insulating film 23. In this embodiment, the auxiliary magnetic pole 21 is disposed on the leading side of the main magnetic pole 32. However, the positions of the primary and auxiliary magnetic poles 32, 21 may be changed. The configuration called the trailing shield may be applicable in which a soft magnetic film is formed above a main magnetic pole via a nonmagnetic film. Alternatively, the configuration called the side shield may be applicable in which a soft magnetic film is formed on the both sides of a main magnetic pole via a nonmagnetic film.

Referring to the enlarged view of FIG. 4, the underlayer film 34 is formed under the main magnetic pole 32 in order to enhance the magnetic property of the main magnetic pole 32. In addition, the nonmagnetic metal film 35 is formed on the main magnetic pole 32. The main magnetic pole 32 is made up of a magnetic film with a high-saturation magnetic flux density, such as FeCo or CoNiFe, or of a stacked film of a FeCo layer and a nonmagnetic layer. The nonmagnetic metal film 35 uses NiCr, Cr, Ta, Au, TaW, etc. or a stacked film thereof. However, the nonmagnetic film 35 may be added as necessary or may be omitted.

The upper side of the main magnetic pole 32 in the air bearing surface is greater in width than the lower side thereof. This configuration provides that the magnetic head 1 will not erroneously erase the data of an adjacent track during writing with a skew angle formed. The main magnetic pole 32 having a single layer magnetic film or a stacked layer structure of a magnetic layer and a nonmagnetic layer has a track width W of, for example, 40 to 250 nm, which is narrowed as the recording density increases. Preferably, the main magnetic pole 32 has a thickness t ranging from 0.5 to 3 relative to the track width w. In addition, the main magnetic pole 32 has an inner angle α ranging from 75° to 88° formed between the surface on the trailing side and the side surface of the main magnetic pole 32. Preferably, the underlayer film 34 has a thickness ranging from 2 to 50 nm. The line connected with the edge of the upper side and the edge of the lower side is depicted as a straight line shown in FIG. 4. The line may be formed with an inwardly or outwardly convex arc.

Figure 5:
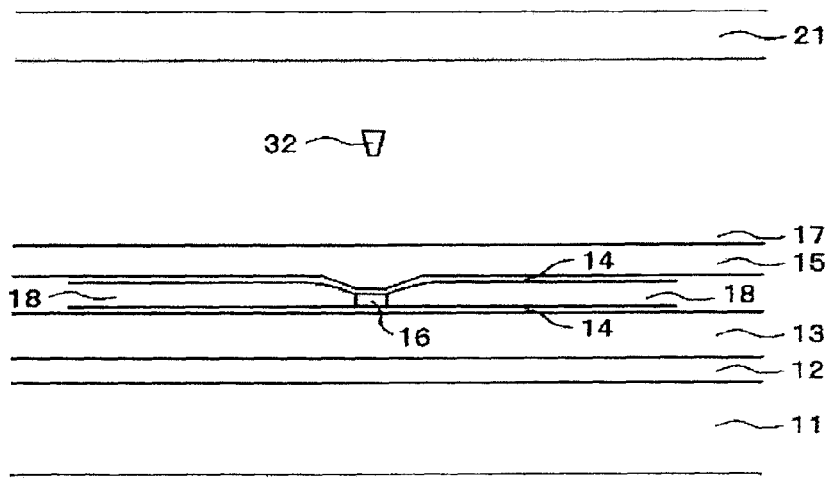
FIG. 5 illustrates an air bearing surface of the magnetic head in which the main magnetic pole and the auxiliary magnetic pole are located inversely.

FIG. 5 illustrates a configurative example in which the positions of the main magnetic pole 32 and the auxiliary magnetic pole 21 are changed as compared with the above embodiment. Unlike the configuration of FIG. 3, the auxiliary magnetic pole 21 is located on the trailing side of the main magnetic pole 32 in FIG. 5. In such a positional relationship, a soft magnetic film called a side shield may be formed on the main magnetic pole 32 via the nonmagnetic film so as to be in contact with the auxiliary magnetic pole 21. In addition, a soft magnetic film called a side shield may be formed on both sides of the main magnetic pole via a nonmagnetic film so as to be in contact with the auxiliary magnetic pole 21.

Figure 6:
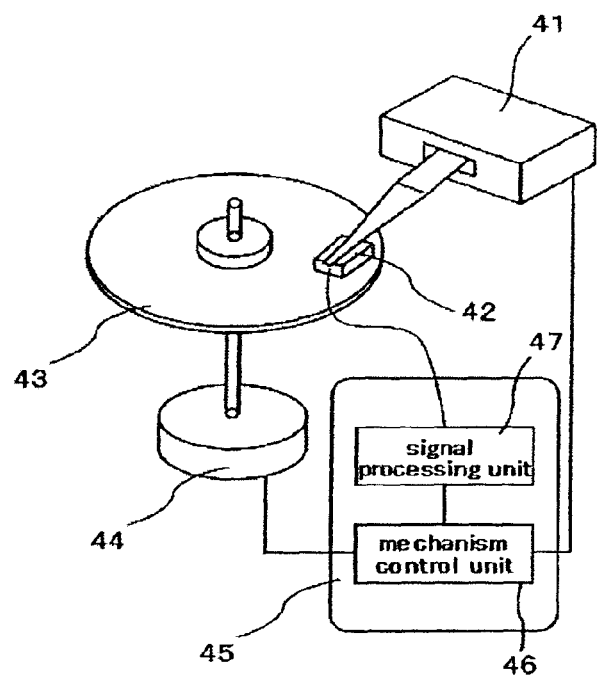
FIG. 6 is a schematic of a magnetic disk drive on which the magnetic head of an embodiment of the present invention is mounted.

FIG. 6 is a schematic view of a magnetic disk drive on which the magnetic head 1 of the above embodiment is mounted. The disk drive includes: a magnetic disk 43 having a perpendicular recording layer and a soft magnetic underlayer; a disk drive motor 44 supporting and rotating the disk 43; a slider 42 having the magnetic head I mounted thereto; an actuator 41 supporting and radially moving the slider 42 over the disk 43; and a signal processing board 45. The signal processing board 45 has a mechanism control unit 46 and a signal control unit 47. The mechanism control unit 46 controls the actuator 41 and the disk drive motor 44. The signal processing unit 47 processes a write signal to be supplied to the write head 20 of magnetic head 1 and a read signal read out from the read head 10 of the magnetic head 1.

Figure 7:
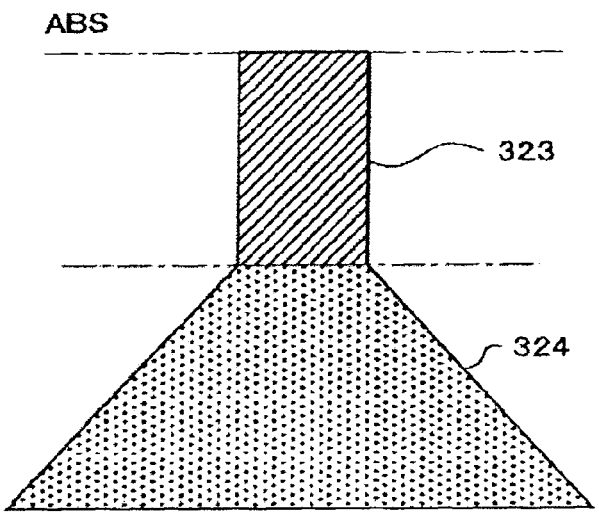
FIG. 7 is a plan view of a main magnetic pole of a conventional magnetic head.

FIG. 7 is a plan view of a trailing side main magnetic pole of the conventional magnetic head as described in patent document 1. In the conventional magnetic head, a track defining section 323 of the main magnetic pole is rectangular and a magnetic flux guiding section 324 is trapezoidal.

Figure 8:
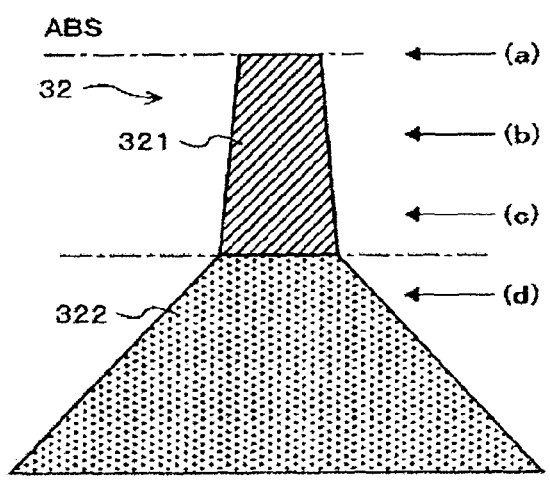
FIG. 8, is a plan view of a main magnetic pole of the magnetic head according to an embodiment of the present invention.

FIG. 8 is a plan view of the trailing side main magnetic pole 32 of the magnetic head 1 according to one embodiment of the present invention. In magnetic head 1 of this embodiment, the track defining section 321 of the main magnetic pole 32 is trapezoidal and the magnetic flux guiding section 322 is trapezoidal so as to join to the rear end of the track defining section 321. The track defining section 321 is formed such that its width parallel to the air bearing surface (ABS) increases as the height-wise length increases at a rate of 10 to 20%. The rate of 10 to 20% is a range in which the shape is accurately controllable taking into account the variations caused by the tolerance (±5%) of the head manufacturing process.

Figure 9:
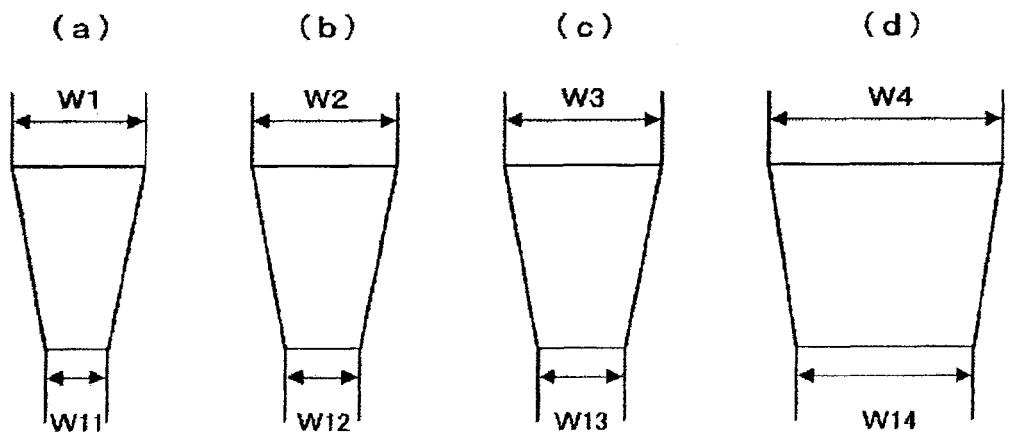
FIG. 9 includes respective cross-sectional diagrams taken along height-direction positions (a), (b), (c) and (d) of FIG. 8.

FIG. 9 illustrates the respective cross-sections at height-direction positions (a), (b), (c), and (d) of FIG. 8. As shown in FIG. 9, the width W2 of the upper side at the height-direction position (b) is greater than the width W1 of the upper side of the track defining surface (a). In addition, the width W12 of the lower side is also greater than the width W11 of the lower side. Further, the width W3 of the upper side and the width W13 of the lower side at the height-direction position (c) are greater than the width W2 of the upper side and the width W12 of the lower side, respectively, at position (d). At position (d) in the magnetic flux guiding section 322, the width W4 of the upper side and the width W14 of the lower side are greater than the width W3 of the upper side and the width W13 of the lower side, respectively, at position (c). Incidentally, the edge of the upper side and the corresponding edge of the lower side in each cross-section are connected with each other by a straight line as illustrated in FIG. 9. However, they may be connected with each other by an inwardly or outwardly convex arc. Such a shape in which its width progressively increases in the height-direction causes an increase in the strength of the magnetic field generated by the write head 20 of the magnetic head 1. This can reduce the variations of the width of the magnetic field with respect to the variations of the length from the medium-facing direction.

Figure 10:
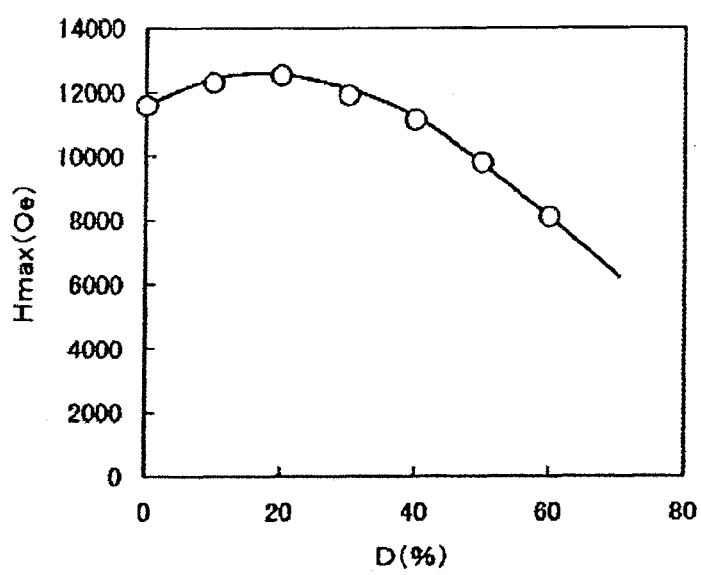
FIG. 10 is a diagram illustrating the effect of the magnetic head according to the present invention and showing the relationship between the magnetic field produced by the write head and the increasing rate of the width of the upper side of the track defining section with respect to the height-direction length thereof.

FIG. 10 shows the relationship between the magnetic field Hmax generated by the write head and the increasing rate D of the width of the upper side of the track defining section relative to the height-direction. As shown in the FIG. 10, for the magnetic field produced by the write head, when the rate D is in the range from 10 to 30%, the large magnetic field Hmax can be obtained.

Figure 11:
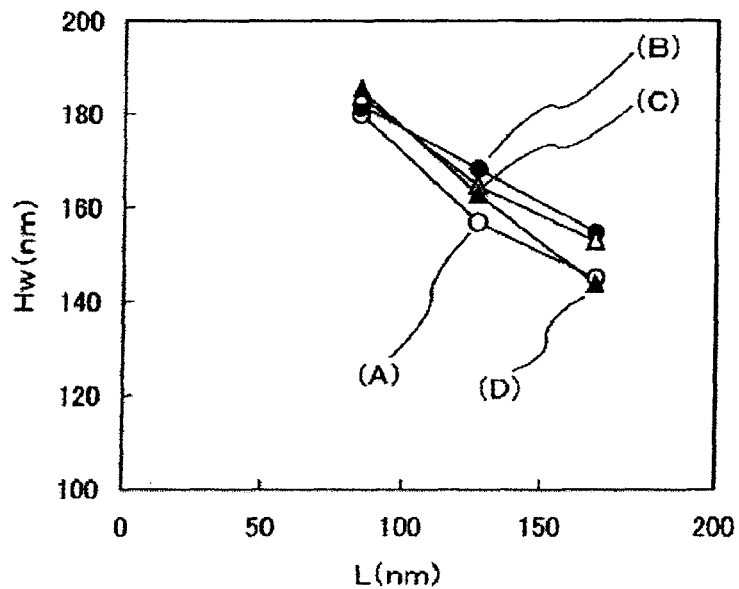
FIG. 11 is a diagram illustrating the effect of the magnetic head according to an embodiment of the present invention and showing the relationship between the width of the magnetic field produced by the write head and the height-direction length of the track defining section.

Next, FIG. 11 shows the relationship between the width Hw of the magnetic field generated by the write head and the height L of the track defining section. In this case, the width Hw of the magnetic field generated by the write head is defined as spacing that can provide a head-magnetic field of 5000 Oe (400 KA/m). FIG. 11 shows the cases where the increasing rates of the width of the upper side of the track defining section relative to the height-direction length are (A):0%, (B): 10%, (C):20%, and (D):30%. As shown in the figure, as the height-wise length of the track defining section is increased, the width of the magnetic field is decreased in each case. In the case of the rate of 10% or 20% as compared with the case of 0%, the amount of change in the width Hw of the magnetic field caused by the height-direction length of the track defining section is small. This is because the head magnetic field is larger than that in the case where the increasing rate of the width of the upper side of the track defining section relative to the height-direction length is 0%. As a result, the reduction in the width of the head-magnetic field decreases. On the other hand, the amount of change is large in the case of the rate of 30%. This is caused by the large change in the geometric track width of the air bearing surface of track defining section.

From the results of FIGS. 10 and 11, when the increasing rate of the width of the upper side of the track defining section relative to the height-direction length is 10 to 20%, the magnetic field generated by the write head can be increased and the amount of change in the width of the magnetic field caused by the variations in the height-direction length of the track defining section can be reduced.

Figure 12:
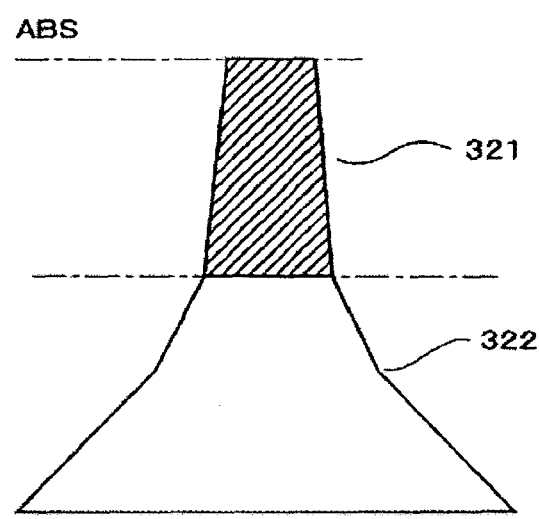
FIG. 12 is a plan view illustrating a modification of the main magnetic pole of the magnetic head according to an embodiment of the present invention.

FIG. 12 is a plan view illustrating a modification of the main magnetic pole. This modification is made such that the magnetic flux guiding section 322 is formed to progressively broaden multi-stepwise as the height-direction length increases. As shown in the modification, since the magnetic flux guiding section 322 is formed to progressively reduce in width as it goes toward the track defining section, the magnetic saturation can be improved in the track defining section. Thus, the write performance of the magnetic head can be enhanced.

Figure 13:
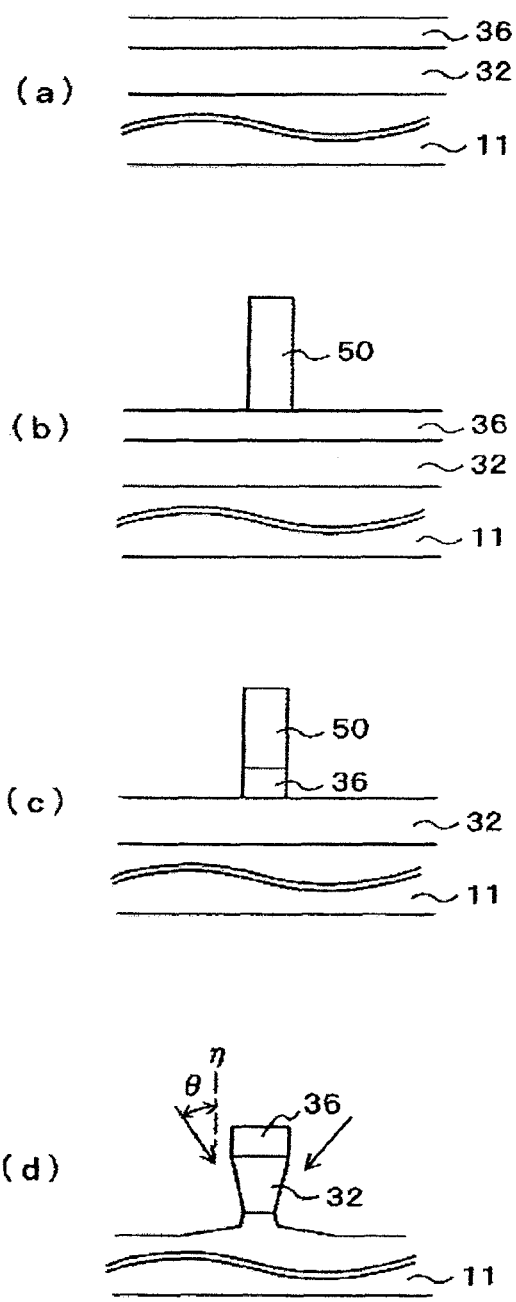
FIG. 13 illustrates the manufacturing steps of the magnetic head according to an embodiment of the present invention, showing the air bearing surface.

Next, a description will be made of a method of manufacturing the magnetic head of the above-described embodiment. Since the method of manufacturing the layers disposed lower than the main magnetic pole 32 is the same as the conventional method, a method of manufacturing the main magnetic pole 32 will be mainly described herein. FIG. 13 illustrates manufacturing steps for the main magnetic pole 32, depicting its air bearing surface. As shown in FIG. 13(a), the layers disposed lower than the main magnetic pole 32 are formed over the substrate 11 and then a magnetic film, e.g. FeCo or CoNiFe, that will serve as the main magnetic pole 32 is formed with a thickness of 50 to 300 nm by plating. Next, on the magnetic film that will serve as the main magnetic pole 32, a nonmagnetic film or organic resin film that will serve as a second mask 36 and has a low etching rate is formed with a thickness of 30 to 1000 nm. Next, photoresist that will serve as a first mask 50 is formed on a nonmagnetic film or organic resin film that will serve as the second mask 36. In order to form the planar shape of the main magnetic pole 32 on the nonmagnetic film or organic resin film, an original drawing on a reticle is transferred to the photoresist by exposure equipment. In this case, the planar shape on the reticle is set according to the reduction scale of the exposure equipment. If the reduction scale of the exposure equipment is 1/5, the planar shape on the reticle is set such that the track width of the track defining section on the trailing side is greater by 25 to 50 nm than a height-direction length of 250 nm of the track defining section.

Then, as shown in FIG. 13(b), the photoresist is patterned to form the first mask 50. The first mask 50 has a thickness of 100 to 1500 nm. In this case, when the first mask 50 is formed, its edge is rounded on the boundary between the track defining section and the magnetic flux guiding section due to an optical effect, developing effect or the like.

Next, as shown in FIG. 13(c), the nonmagnetic film or organic resin film that will serve as the second mask 36, is etched to form a desired shape using the first mask 50. If a film that will serve as the second mask 36 is a nonmagnetic film, a chlorine-based etching gas is used. If a film that will serve as the second mask 36 is thin, it may be etched by the subsequent step of ion-beam etching. If a film that will serve as the second mask 36 is an organic resin film, an $O_2$ or $CO_2$ etching gas is used. Incidentally, it is preferred that the second mask 32 be etched such that it is formed substantially orthogonally to the substrate 11.

Figure 14:
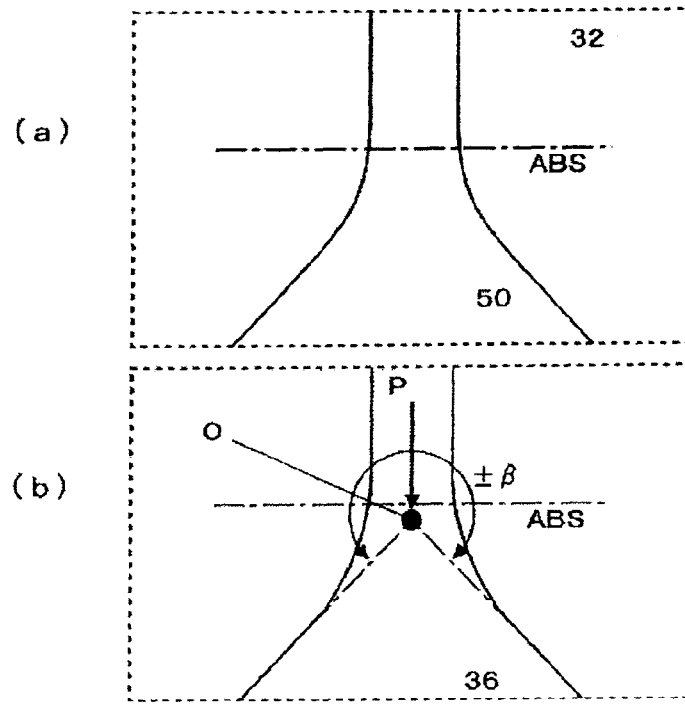
FIG. 14 is a plan view illustrating a method of forming the main magnetic pole by ion milling.

Then, as shown in FIG. 13(d), the incident angle θ of an ion beam relative to the normal line direction n to the substrate surface is set, and the magnetic film that will serve as the main magnetic pole 32 is etched by ion milling using the second mask 36, thereby forming the main magnetic pole 32 in an inverse trapezoidal shape. FIG. 13(d) illustrates the result after the etching, in which the first mask 50 is removed by the etching and the second mask 36 is thinned and reduced in size by the etching. The step of FIG. 13(d) is described in detail below with reference to FIG. 14 as a plan view of the main magnetic pole 32.

FIG. 14(a) is a plan view of FIG. 13(d) before the etching. The second mask 36 and the magnetic film that will serve as the main magnetic pole 32 are present under the first mask 50. As shown in FIG. 14(b) the magnetic film that will serve as the main magnetic pole 32 is etched by ion milling using the second mask 36. The etching is performed in three steps while switching the following three etching requirements (1), (2) and (3).

(1) An etching process is performed by setting the incident angle θ of the ion beam to 40°±20°, and emitting the ion beam while vibrating the substrate surface horizontally at an angle of β in the range of ±(120±15)° relative to the direction of the ion beam based on the direction P from the medium to the air bearing surface (the direction perpendicular to the air bearing surface).

(2) Next, an etching process is performed by setting the incident angle θ of the ion beam to 60°±15°, and emitting the ion beam while vibrating the substrate surface horizontally at an angle of β in the range of ±120±15)° relative to the direction of the ion beam based on the direction P from the medium to the air bearing surface.

(3) Further, an etching process is performed by setting the incident angle θ of the ion beam to 65°±15°, and emitting the ion beam while vibrating the substrate surface horizontally at an angle of β in the range of ±(120±15)° relative to the direction of the ion beam based on the direction P from the medium the air bearing surface.

The etching in the three steps described above can correct the round of the edge at the boundary between the track defining section 321 and magnetic flux guiding section 322. In addition, the width of the upper side of the track defining section 321 parallel to the air bearing surface can be formed to increase at the rate of 10 to 20% relative to the height-direction length.

Etching was performed with changing the range of the angle β at which the substrate surface is horizontally vibrated.

As a result, for ±90°, variation in the width of the upper side of the track defining section 321 was such that: 3σ=27 nm; for ±100°, 3 σ=21 nm; for ±110°, 3 σ=17 nm; for ±120°, 3 σ=16 nm; for ±130°, 3 σ=17 nm; for ±140°, 3 σ=20 nm. Accordingly, when the range of the angle at which the substrate is horizontally vibrated is ±105° to 130°, small tolerance can be provided. In this way, controlling the incident angle and incident direction of the ion beam during ion milling can reduce the influence of the shade associated with the magnetic flux guiding section, thereby resulting in the reduced tolerance.

Next, the rate of time period during which the ion beam was incident was changed in the process of horizontally vibrating the substrate surface at the angle within the range of ±(120±15)°. More specifically, the range of vibration was trisected and the time period during which the ion beam was incident in the region of one end of the vibration range was set 10%, 20% and 30% longer than that in the central region. As a result, the variation in the width of the upper side of the track defining section was such that: 3σ=24 nm for 10%; 3 σ=18 nm for 20%; 3 σ=17 nm for 30%. In this way, the time period during which the ion beam is incident in the region of one end of the vibration range is set longer than that in the central region, whereby the tolerance can be reduced.

Figure 15:
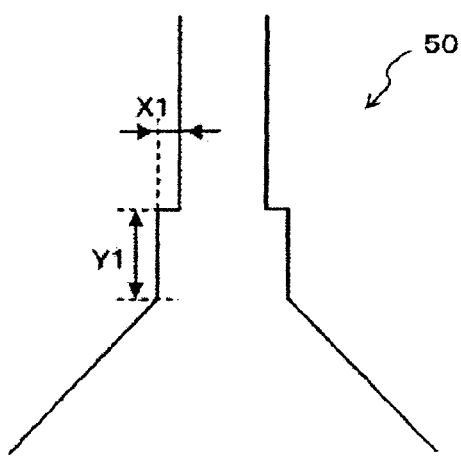
FIG. 15 is a plan view of a reticle used in another method of manufacturing the magnetic head according to one embodiment of the present invention.

A method of manufacturing the main magnetic pole 32 is described by way of another example with reference to FIG. 15. FIG. 15 illustrates the shape of a track defining section drawn on a reticle 50 to be transferred to the photoresist. In the track defining section on the reticle, the length X1 of a projecting part of the track defining section in the track width direction is set to 5 to 10 nm and the length Y1 of the projecting part in the direction perpendicular to the air bearing surface is set to 20 to 100 nm. In this way, the shape of the reticle 50 increases with increasing the height-direction length. Therefore, as described with reference to FIG. 13(d), the incident angle θ of the ion beam with respect to a direction n normal to the substrate surface is set at 60±20°, and the magnetic layer that will serve as the main magnetic pole 32 is etched using a second mask 36 to which the shape of the reticle 50 has been transferred. This can provide a shape in which the width of the track defining section of the main magnetic pole 32 parallel to the air bearing surface increases at the rate of 10 to 20% relative to the height-direction length. Incidentally, the length X1 of a projecting part of the track defining section in the track width direction is based on a single step. However, it may be modified to be based on multiple steps.

What is claimed is:

1. A magnetic head comprising:
   a main magnetic pole provided with an air bearing surface;
   an auxiliary magnetic pole coupled magnetically to the main magnetic pole on the side opposite to the air bearing surface;
   a coil provided to magnetically excite the auxiliary magnetic pole and the main magnetic pole; and
   an insulating film disposed between the auxiliary magnetic pole and the main magnetic pole;
   wherein the main magnetic pole includes:
   a track defining section formed with an upper side and a lower side, the upper side having a width greater than that of the lower side, and
   a magnetic flux guiding section joined to the track defining section and progressively increased in cross-sectional area as spaced apart from the medium-facing surface; and
   wherein a width of the upper side of the track defining section increases in the height-direction at a rate of 10 to 20% with respect to a height-direction length of the track defining section.

2. The magnetic head according to claim 1, wherein the magnetic flux guiding section increases gradually in cross-sectional area as spaced apart from the air bearing surface.

3. The magnetic head according to claim 1, wherein the auxiliary magnetic pole is disposed on the leading side of the main magnetic pole.

4. The magnetic head according to claim 3, further comprising a read head disposed adjacent to the auxiliary magnetic pole.

5. The magnetic head according to claim 1, wherein the auxiliary magnetic pole is disposed on the trailing side of the main magnetic pole.

6. The magnetic head according to claim 5, further comprising a read head disposed adjacent to the auxiliary magnetic pole.

7. The magnetic head according to claim 1, wherein a region in which the upper side of the track defining section increases in width has a height-direction length of 20 to 150 nm.

\* \* \* \* \*